United States Patent [19]

Zak et al.

[11] Patent Number: 4,761,057
[45] Date of Patent: Aug. 2, 1988

[54] APERTURE MEMBER FOR PHOTO PLOTTING APPARATUS

[75] Inventors: Gregory M. Zak, Hamilton Square; Edward Cuomo, Trenton, both of N.J.

[73] Assignee: General Electric Company, Schenectady, N.Y.

[21] Appl. No.: 16,602

[22] Filed: Feb. 19, 1987

[51] Int. Cl.⁴ .......................... G02B 26/02; G01J 3/04
[52] U.S. Cl. .................................. 350/273; 350/319; 356/310
[58] Field of Search ............... 350/271, 273, 275, 266, 350/319, 162.11, 162.12; 356/310, 250, 251; 351/200, 203, 211; D10/61, 64; 33/27.11, 27.01

[56] References Cited

U.S. PATENT DOCUMENTS

| | | | |
|---|---|---|---|
| 2,725,781 | 12/1955 | Banker | 356/251 |
| 3,729,252 | 4/1973 | Nelson | 350/162.12 |
| 4,299,443 | 11/1981 | Minami et al. | 350/162.12 |
| 4,664,516 | 5/1987 | Coppa et al. | 350/162.12 |

*Primary Examiner*—John K. Corbin
*Assistant Examiner*—P. M. Dzierzynski
*Attorney, Agent, or Firm*—William Squire; James C. Davis, Jr.; Paul R. Webb II

[57] ABSTRACT

Photo plotter aperture members each have a beam forming trasnsparent ring and a central transparent cross in communication with the ring. The rings of the different members are of different diameters but of the same thickness as the lines of the respective crosses to provide uniform exposure during half diameter strokes of the aperture members.

12 Claims, 2 Drawing Sheets

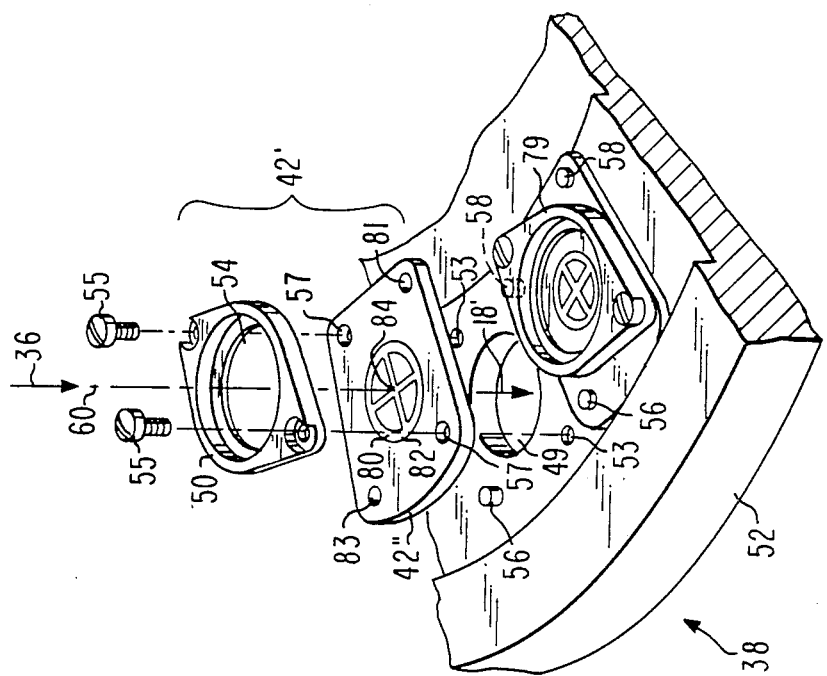
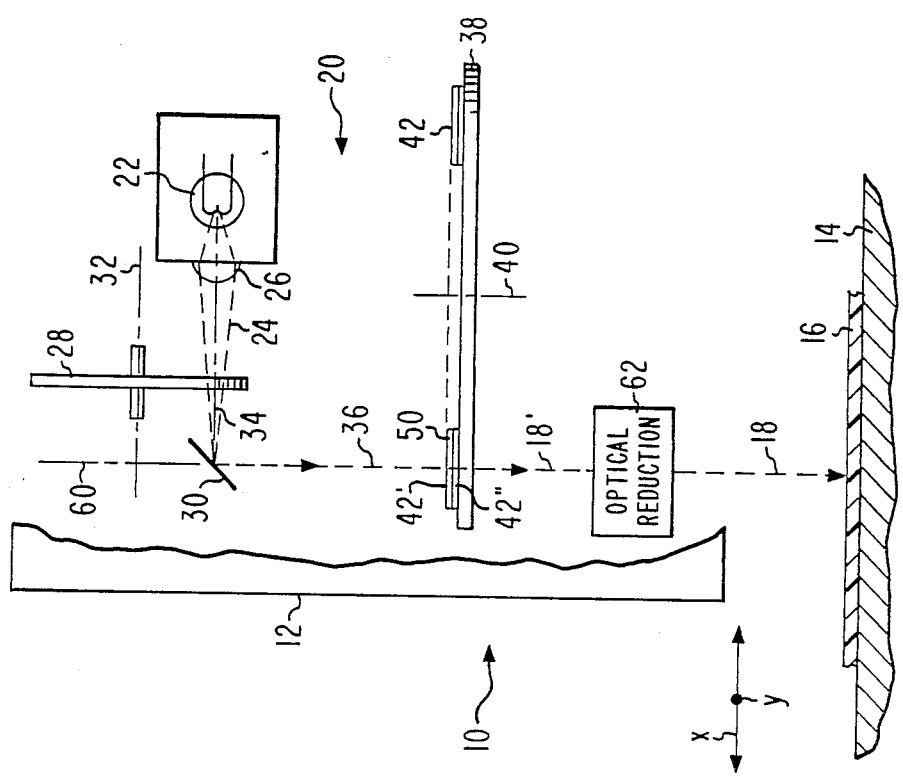
Fig. 2
Fig. 1

APERTURE MEMBER FOR PHOTO PLOTTING APPARATUS

This invention relates to a photo plotting apparatus aperture member for shaping a light beam transmitted onto a photographic or light sensitive material.

Photo plotting apparatuses include a light box and lens system for forming visible light into a beam. The beam is passed through an aperture wheel and thence through an optical reduction system onto a photosensitive material. The aperture wheel contains apertures which shape the beam to form certain patterns. Normally the beam is used to paint a light drawing on the photosensitive material which is supported on a work table. The beam which is projected onto the photosensitive material is displaced over the photosensitive material in X and Y coordinates to create a photographic pattern. The light beam exposes the photosensitive material in accordance with different patterns which may include fine lines and relatively large filled areas. When creating fine lines on the photosensitive material, the beam of light is reduced by the apertures to a relatively narrow diameter light beam, e.g., 5 mils. When creating relatively large areas on the photosensitive material, the beam is opened up to larger diameters which may be, for example, 200 mils.

To change the beam diameter that is received by the photosensitive material, the aperture wheel includes a number of different diameter aperture members releasably secured thereto which are selectively rotated by a computer system into the path of the beam. The different diameter aperture openings change the diameter of the beam in accordance with the type of line that the beam is intended to create on the photosensitive material. One such typical prior art aperture member is shown in FIG. 3 herein.

The problem with this system is that the light source is a constant intensity so that when light is passed through the different diameter apertures the intensity of the beam varies from a relatively small value of the fine diameter beam to a large value for the relatively larger aperture openings. However, the light sensitive photographic emulsion has one exposure rate throughout. The use of beams of different intensities and the motion of the beam in the X-Y coordinate directions being at the same rates regardless of the beam diameter may cause over or under exposure of the photosensitive material in accordance with the given beam diameter.

A variable neutral density filter wheel is employed in this system which has different light transmission densities. An appropriate density on the wheel is automatically rotated into the beam path by a computer system. The filter wheel reduces the beam intensity for slower plotting speeds and increases the intensity for faster plotting speeds. However, such a wheel is insufficient for compensating for all of the light exposure variables induced in a normal drawing system. For example, the beam carriage accelerates and decelerates to and from dead stops and also moves at a constant rate in moving the beam across the workspace. The rates of these motions are the same regardless of beam diameter. Some patterns such as keys are created by instantly flashing the beam through a patterned aperture while the beam is stationary. These accelerations and decelerations, other motions and flashes result in a need for additional neutral density filters. Such additional neutral density filters are manually added to each aperture member on the aperture wheel. The addition of neutral density filters to the aperture wheel is cumbersome to implement, requires the manual addition and removal of the filters, and also poses a quality problem in that the filters are usually added to the aperture members and tend to capture dust particles and be a detriment to the resultant beam.

An improvement to this system is one employed privately in a research environment by the assignee of the present invention as depicted in FIGS. 4 and 5 herein. In this system, the different diameter apertures of the aperture member are replaced with aperture rings of different diameters but of constant ring radial thickness. This results in uniform exposure of the photosensitive material regardless the beam diameter and speed rates during the painting. This system avoids the need for additional neutral density filters for each aperture member. However, this system has a problem in that in certain instances the ring shaped beam does not fully expose the region intended, for example, in half diameter strokes. This results in a poor drawing.

Other systems, used a number of years ago privately by the assignee of the present invention which have since fallen into disuse, employed apertures developed by the assignee of the present invention. Those apertures were rectangular and line-like in shape. These apertures were used with systems whose computer software programming was compatible with such aperture shapes. However, current photo plotter systems use more advanced computer systems and use software which is not compatible with such line-like apertures. This latter software is especially designed for use with circular apertures of the type discussed above. These line-like systems have been occasionally used by the assignee of the present invention for a number of years.

An aperture member according to the present invention for a photo plotting apparatus of the type including means for forming and shaping a light beam and means for supporting a member in the path of the beam to alter the beam shape in accordance with the light transmission characteristics of the member includes an opaque substrate and means for securing the substrate to the apparatus. The substrate has a transparent ring which forms the beam into a light ring of uniform thickness and a transparent cross within the ring defined by intersecting first and second transparent lines located to further form the beam into a light cross within the ring of light.

IN THE DRAWING

FIG. 1 is a side elevation view, partially diagrammatic, of a photo plotting apparatus including an aperture member according to one embodiment of the present invention;

FIG. 2 is an exploded isometric view of the aperture wheel of the embodiment of FIG. 1;

Figure 3:
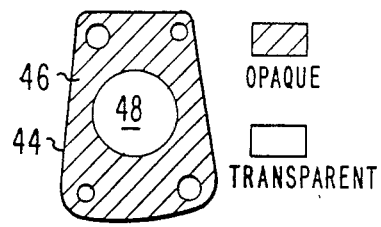
FIGS. 3 and 4 are plan views of different embodiments of prior aperture members.

In FIG. 1, a photo plotter system 10 comprises a housing 12 (shown diagrammatically) which is attached to a fixed table 14 via ways and drive motors (not shown) for displacement in X-Y coordinates, the Y coordinate being perpendicular to the plane of the drawing FIGURE. The housing 12 is driven in the X-Y coordinates by a drive system (not shown) included with the photo plotter system 10 which is commercially available. The drive system is under control of a computer program which moves the housing 12 and its contained optics, to be described shortly, in predetermined X and Y directions in accordance with a given pattern. That given pattern is a pattern which is typically transferred to a light sensitive material 16 supported on table 14. The pattern (not shown) is provided on optical axis 60. Beam 18 is generated by optical system 20 contained within housing 12. The beam 18 is projected onto photosensitive material 16 along axis 60 in the given pattern as determined by a computer program. The photosensitive material 16 is later developed to reproduce that pattern.

The beam 18 produced by the optical system 20 is required to have a number of unique characteristics for purposes of producing a pattern on the photosensitive material 16. The beam is required to have different beam diameters normally in the range of 5-200 mils and is required to reproduce a pattern containing lines which may be as small as 5 mils in width and may also be used to fill in relatively large areas to produce a relatively large exposed region. Fine line patterns require a relatively small diameter beam. Larger thickness lines require beams of proportionately larger diameters. Normally in reproducing the pattern, the process is referred to in this art as "painting."

In painting a large filled-in area, the outline of the filled-in area is painted with a small diameter beam and the filled-in portion is created with a maximum diameter beam to reduce the number of motions made by the housing 12 and the generated beam 18 in reproducing the pattern. Therefore, normal operation of the optic system 20 requires the beam 18 to have a large number of different beam diameters, for example, about a maximum of 24 in one implementation. The computer program in system 10 automatically changes the diameter of the beam 18 in a known way.

To produce the beam 18, the optic system 20 includes a light source 22 which produces a beam 24 focussed by a lens 26. The beam is projected through a variable neutral density filter wheel 28 onto a reflector 30. Wheel 28 rotates about axis 32 in response to the computer program mentioned above. The purpose of filter 28 is to provide a beam transmitted by filter 28 of a given intensity to compensate for the different plotting speeds. The photosensitive material 16 includes an emulsion which has a given exposure rating. Therefore, ideally the photographic emulsion on photosensitive material 16 should always have a given intensity of light incident thereon for a given time interval. Because the housing 12 is displaced in the X and Y coordinates by a drive system which is subject to acceleration, deceleration, and change of directions, in combination with the fact that the beam 18 may have different diameters, the intensity of the light beam 18 incident on photosensitive material 16 in a given time interval may differ significantly.

For example, when the housing 12 decelerates to zero velocity to change direction, the beam 18, unless otherwise provided for, would tend to overexpose the photosensitive material 16 during a portion of this cycle. For this reason, the variable neutral density filter wheel 28 is programmed to change the intensity of beam 18 in an attempt to maintain the light exposure (time and intensity) on the photosensitive material 16 to a fixed value. This value which ideally should be constant changes because of the variable exposure conditions discussed above. To this extent, the wheel 28 contains a number of different neutral density filters having different light transmission characteristics for effecting as close as possible a predetermined constant exposure value on photosensitive material 16.

In forming beam 18, beam 34 is reflected by reflector 30 into beam 36 which is projected through an aperture wheel 38 which creates beam 18'. Wheel 38 is a disc-like member which rotates about axis 40 in response to the computer program of system 10. Wheel 38 contains an annular array of aperture assemblies 42—42', each of which has a predetermined shaped light transmitting aperture. The aperture assemblies 42—42' have circular apertures which differ in diameter, e.g., from 5 mils to 200 mils. These apertures appear optically as different size f-stops to the system. The diameter and order of the different apertures of the different aperture assemblies on aperture wheel 38 are in accordance with a given implementation. That is, the diameters of the apertures of adjacent aperture assemblies need not be in any given order, but correspond to the desired pattern to be drawn by the computer program in system 10.

In FIG. 2, wheel 38 includes wheel body 52 and representative aperture assembly 42'. Assembly 42' comprises a locking ring 50 and an aperture member 42". Member 42" is attached to body 52 by locking ring 50. It is to be understood, in practice, the wheel 38 includes a circular array of similar such aperture member assemblies such as assembly 79. The aperture wheel body 52 is a ring-like disc which has two threaded holes 53 which receive screws 55 for securing locking ring 50 to the wheel. Body 52 has a circular array of holes 49, only one of which is shown, each of which is concentric with the optical axis 60 when aligned thereon. The axis 60 has a fixed position relative to housing 12. The screws 55 pass through holes 57 in the aperture member 42". The member 42", a generally trapezoidal opaque plastic sheet, is sandwiched between locking ring 50 and body 52. Member 42" contains transparent pattern 80 forming the beam shaping aperture. The pattern 80 is formed on member 42" using photographic processes. The diameter of the apertures of the different aperture members differ. Also, the aperture shape may differ among several of the aperture members.

The locking ring 50 is somewhat diamond shaped having a central beam receiving circular hole 54. Hole 54 is the same diameter for all aperture member supports. Hole 54 is concentric with the transparent aperture of the mating aperture member. A pair of locating pins 56 and 58 on body 52 locate the member 42" pattern 80 concentric to and appropriately oriented about optical axis 60 when aligned on axis 60. Two locating holes 81 and 83 are in member 42" for receiving respective locating pins 58 and 56 on body 52.

Pattern 80 contains an aperture ring 82 and central cross 84 which is positioned with one line thereof parallel to one of the X-Y coordinates and the other line parallel to the other coordinate when in the position of producing beam 18', FIG. 1. Any number of members similar to member 42" are spaced about wheel 52 in a circular array. The apertures of the members of the different aperture assemblies are selectively positioned on optical axis 60 by the system computer program in accordance with the required sequence of the pattern being generated.

In FIG. 1, after the beam 36 passes through the aperture of a given aperture assembly 42—42', the shaped beam 18' is passed into an optical reduction system 62 which reduces the beam diameter, e.g., 3:1 in one implementation. Therefore, the diameter of the beam 18' passing through a given aperture has a diameter which is three times as great as the diameter of beam 18 incident on the photosensitive material 16. The diameters of the apertures in members 42 of wheel 38 necessarily are three times greater than beam 18 to compensate for the beam reduction of system 62.

In contrast to the cross hair aperture 80 of the present invention, a representative aperture member 44 of prior art systems, FIG. 3, has a circular transparent region 48 of a given diameter. The diameter of the circular region 48 is different for different members attached to the aperture wheel 38 of FIG. 1. The problem with the use of aperture member 44 is that during normal operation the variable density filter wheel 28 (FIG. 2) is used by the system controller to compensate only for changes in housing 12 speeds, as discussed in the introductory portion, but not for differences between apertures. The latter requires the additional neutral density filters at each aperture member to further make the intensity of the beam 18 relatively constant and introduces the noted additional problems.

Figure 4:
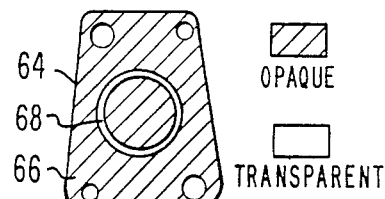

An improvement of the prior art aperture member 44 is shown in FIG. 4 comprising an aperture member 64. This aperture member does not require the additional neutral density filters. In FIG. 4, a predominately opaque region 66 has an aperture which is a transparent circular ring 68 of a given radial thickness. A similar transparent ring but of different diameter is provided each aperture member secured to the aperture wheel 38. However, the ring radial thickness regardless its outer diameter always remains the same. As a result, the intensity of the light beam passed by any given diameter ring over a given area of the photosensitive material always remains constant regardless the overall ring diameter. This permits the variable neutral density wheel 28, FIG. 1, to compensate for the different motions of the housing 12, as explained above. The different diameters of the apertures of the different aperture members, because of the constant ring thickness, precludes additional exposure variables to the system. The ring aperture of member 64 avoids the need for neutral density filters adjacent the aperture member. However, the aperture of member 64 poses a problem.

Figure 5:
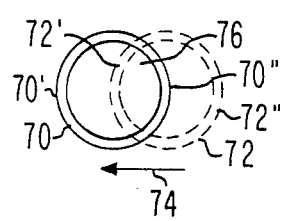
FIG. 5 is a diagram useful in explaining the problem with the embodiment of the FIG. 4 aperture member.

In FIG. 5, ring pattern 70 shown in solid line illustrates an instantaneous pattern produced by a beam formed by member 64. Ring pattern 72, shown in phantom, shows the pattern produced by the aperture member 64 at a prior moment before production of the pattern 70. The beam producing the patterns 70 and 72 is displaced in direction 74.

It is assumed that the pattern 72 represents the initial start point of a line being created in direction 74 and pattern 70 represents the stop pattern at the end of that line. A central region 76 has not been exposed on the photosensitive material because region 76 has not received light from the ring beam. That is, pattern portion 72' at the initial start point is displaced to portion 70' of pattern 70. Meanwhile, portion 72" has displaced to the position of portion 70". None of the portions of the ring pattern has passed over the region 76.

The displacement magnitude is about half the diameter of the ring of the pattern. Therefore, it is seen that for the region 76 to be fully exposed, the ring pattern 70 must be displaced in direction 74 for a distance equal to the diameter of the ring less twice its thickness. The patterns produced by the system 10, FIG. 1, are produced by computer programs inherent in the system, as manufactured. These computer programs, at times, require half diameter motions as discussed above. Employing the ring type aperture of FIGS. 4 and 5 results in undesirable unexposed regions.

Figure 6:
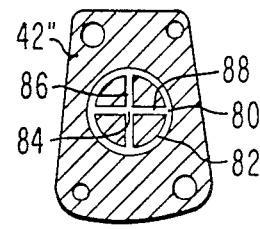
FIG. 6 is a plan view of an aperture member according to the embodiment of FIG. 2.

The aperture of member 42", FIG. 6, according to one embodiment of the present invention alleviates this problem of unexposed regions during half diameter motion cycles. A generally opaque aperture member 42" has a transparent aperture formed by pattern 80. Pattern 80 comprises a circular transparent ring 82 in communication with a central transparent cross 84. Cross 84 comprises two lines 86 and 88 which are perpendicular and preferably are integral with ring 82 at the line ends. The lines 86 and 88 have the same thickness as the radial thickness of the ring 82. The lines 86 and 88 are respectively parallel to the X and Y coordinates of the system 10 when the aperture pattern 80 of member 42" is aligned on axis 60, FIG. 1.

Figure 8:
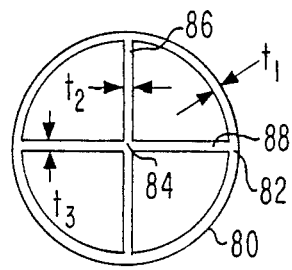
FIG. 8 is an enlarged view of the beam formed by the aperture member of FIG. 6.

In FIG. 8, the ring thickness $t_1$ is the same as the line thicknesses $t_2$ and $t_3$ of the cross 84. Preferably, the thicknesses $t_1$, $t_2$ and $t_3$ are about 3 mils on the projected pattern at photosensitive material 16, FIG. 1. However, due to the optical reduction system 62 which, in this case is 3:1, the actual thicknesses at member 42" is three times that value or 9 mils. The thicknesses $t_1$, $t_2$ and $t_3$ are the same regardless the overall diameters of the aperture rings 80. This is important to provide substantially uniform exposure of photosensitive material 16, FIG. 1, during use of the different aperture diameters. It is important that the lines of the cross hairs and the ring thickness be the same to insure that uniform exposure regardless of the aperture diameter. This avoids the need of additional neutral density filters even with the addition of the cross hairs to the aperture member.

Figure 7:
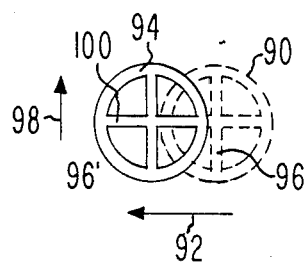
FIG. 7 is a plan view of the beam formed by the aperture member of FIG. 6 useful in explaining the principles of the present invention.

In FIG. 7, it is assumed that the pattern 90 shown in phantom is at the initial start point and pattern 94 is at the stop point. Pattern 90 has been displaced in direction 92 which is in one of the Y or X directions. The line 96 normal to direction 92 is displaced to the position of line 96' of pattern 94. When the pattern 90 is displaced a half diameter to the position of pattern 94, the line 96 fully exposes the intervening region and thus avoids the unexposed region 76 of the pattern of FIG. 5. Similarly, when the pattern 90 is displaced in the other coordinate direction 98, line 100 normal to that direction fully exposes the intervening region when the pattern is displaced a radius distance of the aperture ring diameter.

Figure 9:
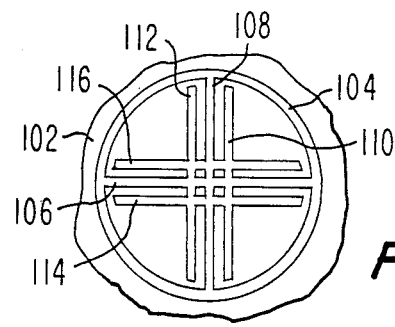
FIG. 9 is a plan view of an aperture member according to a second embodiment of the present invention.

The transparent cross hair described above is employed for half diameter displacements. However, for less than half diameter displacements, additional lines may be provided. In FIG. 9, transparent lines 110 and 112 are symmetrical and parallel to cross hair line 108. Similarly, lines 114 and 116 are symmetrical and parallel to cross hair line 106. The ends of the lines 110–116 are not contiguous or integral with the ring 104. The reason for these gaps is to preclude overexposing the photosensitive material, which might occur should the added lines merge with the rings. Additional lines parallel to lines 108 and 106 may also be provided for different motion displacements of the aperture wheel in a given X-Y direction.

What is claimed is:

1. An aperture member for photo plotting apparatus of the type including means for forming and shaping a light beam and means for supporting said member in the path of said beam to alter the beam shape in accordance with the light transmission characteristics of said member, said member comprising:
    an opaque substrate; and
    means for securing the substrate to said apparatus;
    said substrate having a transparent ring which forms said beam into a light ring of uniform thickness, and a transparent cross within said ring defined by intersecting first and second transparent lines located with said ring to further form said beam into a light cross within said ring of light.

2. The member of claim 1 wherein said lines are the same uniform thickness.

3. The member of claim 1 wherein said lines are contiguous at their ends with said transparent ring so that said ring and cross light beams are integral.

4. The member of claim 1 wherein said lines and ring are of the same thickness.

5. The member of claim 1 wherein said lines and ring are dimensioned such that the beam lines and ring are about at least 3 mils in thickness.

6. The member of claim 1 wherein said substrate includes at least one additional transparent line in communication with one of said first and second lines and parallel to the other of said first and second lines.

7. The member of claim 1 wherein said ring is circular and said lines intersect at the center of said ring.

8. In a photo plotting system including means for forming a light beam and means for projecting said beam in a given path, a plurality of aperture members comprising:
    a support wheel for moving a selected portion thereof into the path of said beam; and
    a plurality of aperture members each secured to the wheel in a circular array at a separate different portion such that one member at a time is inserted into said beam path, each aperture member including:
    an opaque substrate; and
    means for securing the substrate to the wheel;
    said substrate including a transparent ring of a given diameter and thickness, and a transparent cross within said ring.

9. The system of claim 8 wherein said crosses comprise first and second perpendicular transparent lines which intersect substantially centrally the corresponding ring.

10. The system of claim 8 wherein said ring is circular, said cross being in communication with the ring at the ends of the cross.

11. The system of claim 8 wherein one of said lines is parallel to a tangent to the wheel and the other of said lines lies on a radial line through the axis of rotation of the wheel.

12. The system of claim 8 wherein all said rings and crosses of said members have substantially the same thickness regardless the diameter of said rings.

* * * * *